Patented Oct. 28, 1930

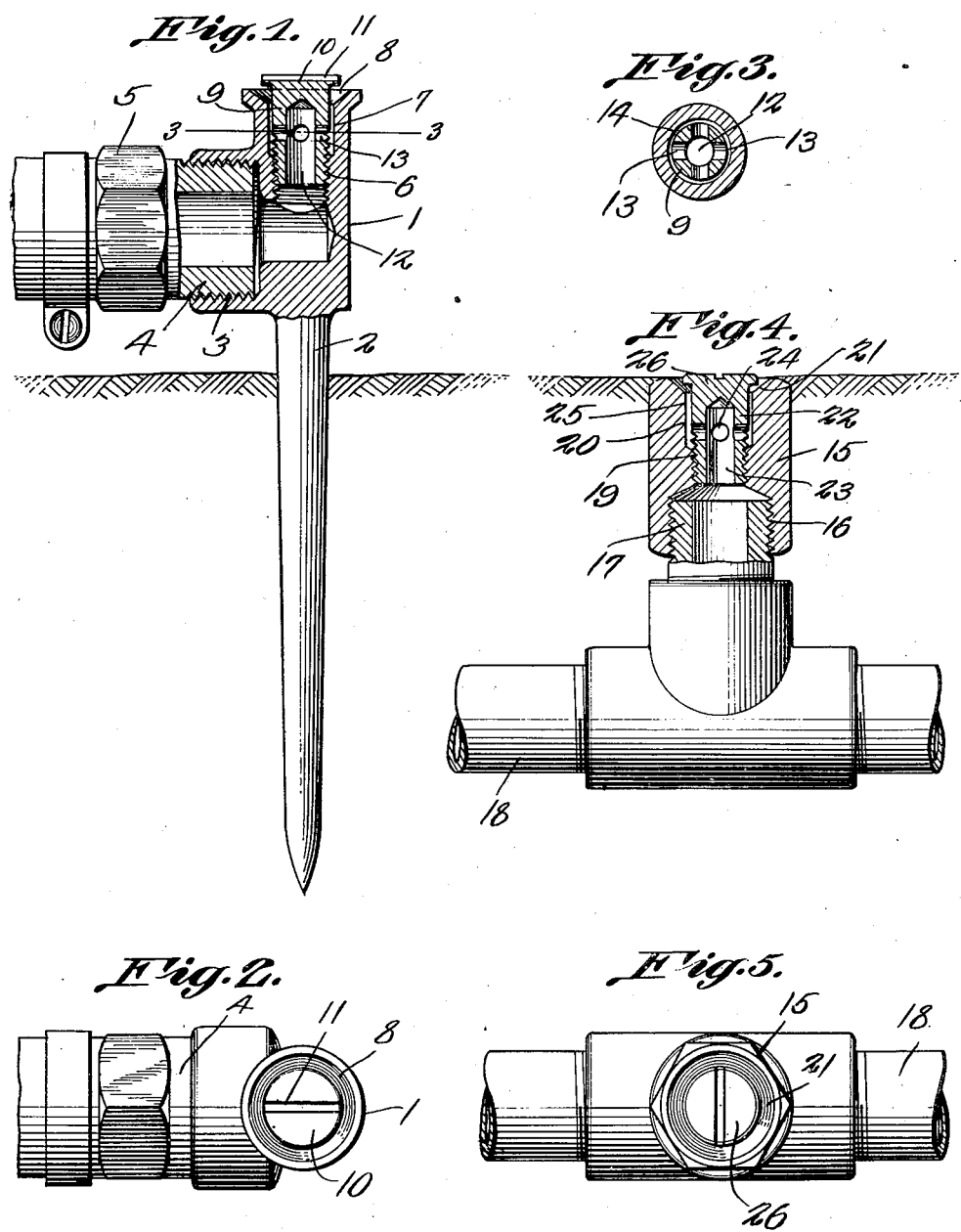

1,779,691

UNITED STATES PATENT OFFICE

ALBERT E. BENNETT, OF SOUTH JACKSONVILLE, FLORIDA

LAWN SPRINKLER

Application filed June 28, 1928. Serial No. 288,914.

This invention relates to a lawn sprinkler designed for delivering a spray over an extensive area, one of the objects being to provide a sprinkler which can be adjusted readily to control the spray, and can be easily cleaned.

A further object is to provide a sprinkler which, if desired, can be embedded in the ground so that its top will be flush with the surface, a number of the sprinklers being connected to a single water supply pipe buried in the ground.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred forms of the invention have been shown.

In said drawings,

Figure 1 is a view partly in section and partly in elevation of a sprinkler embodying the present improvement and designed for use in connection with a garden hose.

Figure 2 is a plan view thereof.

Figure 3 is a section on line 3—3, Figure 1.

Figure 4 is a section through another form of sprinkler to be embedded in the ground so as to have its upper end substantially flush with the surface of the ground.

Figure 5 is a top plan view of the structure shown in Figure 4.

Referring to the figures by characters of reference 1 designates the casing of the sprinkler in the form of an elbow from the bottom of which is extended an integral stake 2 adapted to be forced into the ground for the purpose of supporting the casing. One of the arms of the elbow has a screw-threaded recess 3 for the reception of a threaded nipple 4 extending from a hose coupling 5. The other arm of the casing, which extends upwardly, has a screw-threaded bore 6 opening into the casing, the outer portion of this bore being counterbored as shown at 7 with its upper end flared as at 8.

Seated in the bore 6 is a valve 9 the inner end portion of which is exteriorly screw-threaded for engagement with the threads in the bore 6. The outer end of the valve has a head 10 provided with a kerf 11 by which the valve can be adjusted readily by means of a screw driver or the like so as to move the marginal portion of the head into contact with or away from the surface of the flared portion 8. A longitudinal recess 12 extends into the valve from the inner end thereof and radiating from this recess are outlet ports 13 which open into the counterbore 7. Obviously an annual chamber 14 is formed between the wall of the counterbore 7 and the valve 9 and water escaping through the ports 13 will be delivered into this chamber from which it will be delivered upwardly against the bottom surface of the marginal portion of head 10. This surface will act to break up the stream of water into a fine mist or spray which will be deflected radially in all directions, the adjustment of the head 10 toward or from the surface of the flared portion 8 operating to control the volume and the velocity of the spray. As a matter of fact by forcing the valve inwardly to the limit of its movement, the marginal portion of the head will bind against the flared portion 8 so as to cut off the escape of water.

Instead of mounting the structure on a stake as shown in Figure 1, it can be so constructed as to be supported below the surface of the ground. As shown for example in Figure 4 the casing 15 can be formed with a recess 16 in its lower end for receiving a nipple 17 extending upwardly from a water supply pipe 18 embedded in the ground. A bore 19 is extended downwardly into the casing 15 from the upper end, the lower portion of this bore being screw-threaded and opening into the recess 16. The upper portion of the bore 19 is counterbored as at 20 and has a flare 21 at the top. A valve 22 similar to the valve 9 already described is mounted in the bore 15 and has a recess 23 extending upwardly thereinto. Radial outlet ports 24 extend from this recess into the annular compartment 25 formed between the valve and the wall of the counterbore. A head 26 of the valve is adapted to be supported within the flared portion 21 and will have its upper surface flush or substantially flush with the surface of the ground. Thus a lawn mower or the like can be moved thereover without injury. By adjusting the valve the spray can be regulated or the water can be turned off completely. Where a number of spraying devices such as described are connected to one pipe 18, one or more of them can be cut off while the others are in operation. Obviously when the margin of the head 10 or 26 is close to the wall of the flared portion of the casing the spray will be delivered upwardly at a greater angle relative to the surface of the ground than when the head is adjusted upwardly to a greater distance from the flare. Thus the spray can be made to cover different areas.

What is claimed is:

The combination with a casing having a screw-threaded bore therein, one end portion of the bore being counterbored and flared, there being an inlet recess in the other end of the casing opening into the bore, of a screw-threaded valve seated in the threaded bore and spaced from the wall of the counterbore, there being a recess extending into the valve from the inner end thereof and provided with outlet ports opening into the counterbore, and a head at the outer end of the valve providing an annular projecting portion having a flat lower surface extending beyond the wall of the counterbore and constituting means for breaking up a stream of water issuing from the bore, said annular projecting portion being adjustable against the flared portion of the casing to cut off the flow of water, all portions of the head being seated in the flared portion and between the ends of the casing when the water is cut off, the angle at which the spray is delivered from the casing being varied by the adjustment of said head relative to the casing.

In testimony that I claim the foregoing as my own I have hereto affixed my signature.

ALBERT E. BENNETT.